(12) United States Patent
Quiroz

(10) Patent No.: US 6,577,797 B2
(45) Date of Patent: Jun. 10, 2003

(54) OPTICAL FIBER RIBBON ASSEMBLY WITH STRAIN RELIEF

(75) Inventor: David Quiroz, W. Covina, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/852,817

(22) Filed: May 9, 2001

(65) Prior Publication Data

US 2002/0168156 A1 Nov. 14, 2002

(51) Int. Cl.⁷ .................................................. G02B 6/44
(52) U.S. Cl. ...................................................... 385/114
(58) Field of Search .................... 385/100, 101, 385/103, 109, 110, 111, 112, 113, 114

(56) References Cited

U.S. PATENT DOCUMENTS

| | | | | |
|---|---|---|---|---|
| 4,190,319 A | * | 2/1980 | Eggleston | 385/114 |
| 4,467,138 A | * | 8/1984 | Brorein | 174/115 |
| 4,715,677 A | * | 12/1987 | Saito et al. | 385/114 |
| 5,039,195 A | * | 8/1991 | Jenkins et al. | 385/101 |
| 5,180,890 A | * | 1/1993 | Pendergrass et al. | 174/117 |
| 5,602,953 A | * | 2/1997 | Delage et al. | 385/101 |
| 5,673,352 A | * | 9/1997 | Bauer et al. | 385/114 |
| 5,802,231 A | * | 9/1998 | Nagano et al. | 385/114 |
| 6,067,394 A | * | 5/2000 | Ruello et al. | 385/106 |
| 6,097,866 A | * | 8/2000 | Yang et al. | 385/114 |

FOREIGN PATENT DOCUMENTS

JP 362008111 A * 1/1987 ................. 385/114

* cited by examiner

Primary Examiner—Lynn D. Feild
Assistant Examiner—Thanh-Tam Le
(74) Attorney, Agent, or Firm—Wei Te Chung

(57) ABSTRACT

An optical fiber ribbon assembly includes a plurality of aligned optical fibers, a strain relief structure aligned with the fibers, and a protective layer integrally bonding the fibers and the strain relief structure together. The strain relief structure has at least a pair of strength members disposed on opposite sides of the aligned fibers and extending lengthwise along the ribbon assembly.

13 Claims, 3 Drawing Sheets

OPTICAL FIBER RIBBON ASSEMBLY WITH STRAIN RELIEF

BACKGROUND OF THE INVENTION

1. Field of the Invention

The present invention relates to an optical fiber ribbon assembly, and particularly to an optical fiber ribbon assembly with strain relief integrated therein.

2. Description of Related Art

Optical fibers are now used in a variety of telecommunication applications because of small physical size and high bandwidth capacity. An optical fiber cable typically contains a number of individual optical fibers. The optical fibers can be contained in the cable in a variety of configurations, such as loose-tube cables, tight-buffered cables, or optical fiber ribbons.

It is not uncommon that an optical fiber cable containing an optical fiber or optical fibers undergoes rough handling or is exposed to a physical environment that stresses the fiber or fibers within the cable. For example, an optical fiber contained in an optical fiber cable can experience stress and strain when the cable is bended or stretched during winding on a reel for purposes of storage. An optical fiber cable pinched between other cable components may subject to mechanical stress due to difference between the coefficients of thermal expansion for the optical fiber and the other components, such as a tube of the optical fiber cable containing the fiber or a protective layer of an optical fiber ribbon cable.

A variety of techniques have been developed to hold and protect individual fibers from damage. For example, fibers are frequently encased in a jacket or other protective material. In addition, individual fibers are often grouped together to provide a cable capable of carrying increased amounts of information.

Cylindrical optical fiber cables usually employ additional protective layers to release stochastic strain or stress exerted thereon. These protective layers commonly include buffer tubes/layers, strength members, filler members in loose-tube type cables, and thick jackets made of PVC or other proper materials.

However, in the case of ribbon type optical fiber cables, some of the more ordinary protective means, such as filler members, used in the cylindrical optical fiber cables become unfeasible. Instead, other protective design using elements such as buffers or strength members, can be applied around individually optical fibers contained in a ribbon cable. Although polyvinyl chloride (PVC) protective layers can also be used to alleviate strain or stress put on the ribbon, it is often not enough to protect the ribbon from stochastic overloaded tension exerted thereon during installation or occasions thereafter.

Individual optical fibers have been woven into sheets, providing a workable solution to the above-discussed problems. For example, as disclosed in U.S. Pat. Nos. 5,524,679, 5,469,895, 5,280,558 and 5,256,468, optical fibers are woven into a supporting structure. Once completed, the woven, grid-like mat can be coated with various types of protective material, such as an elastomer or a rubber epoxy, to form a flexible sheet with the optical fibers embedded therein. Alternatively, the structure can be coated or embedded in a rigid material, such as epoxy, to form a hard or rigid grid-like structure.

Although such flexible or rigid grid-like mat structures can achieve good tensile resistance, they unavoidably result in a highly complicated manufacture with attendant high costs.

Another related prior art for solving the problem discussed above is disclosed in U.S. Pat. No. 4,679,897 as shown in FIG. 5. An optical fiber ribbon cable combination 1 includes a pair of plastic tapes 14, a ribbon 10 consisting of a plurality of optical fibers 15, and a pair of plastic insulated copper conductors 12. The ribbon 10 is disposed between the pair of conductors 12 and the conductors 12 extend lengthwise of the tape along with the ribbon 10. The ribbon 10 and the conductors 12 are sandwiched between the pair of tapes 14. The ribbon 10 is loosely housed within an elongate compartment defined by the conductors 12 and the tapes 14. When a tensile force is applied to the cable 1, the conductors 12 and the tape 14 help carry the tensile load, sparing the ribbon 10 from carrying all the whole tensile load.

However, the conductors 12 can be easily disconnected from the tape 14 under the tensile force applied thereon since the conductors 12 are only attached to the pair of tapes 14 by fusion bonding. Furthermore, although the ribbon 10 is loosely housed in the compartment between the conductors 12, it is still possible for it to be subjected to bear the transverse tensile force applied on the cable 1, especially when the cable 1 is transversely bent and the conductors 12 have nearly between detached from the tape 14.

BRIEF SUMMARY OF THE INVENTION

An object of the present invention is to provide an optical fiber ribbon which can be tensile loaded without damage to optic fibers therein and which can be manufactured at low cost.

Another object of the present invention is to provide an optical fiber ribbon having strain relief structures for mitigating the tensile force applied to the optic fibers.

In accordance with one aspect of the present invention, an optical fiber ribbon assembly comprises: a plurality of aligned optical fibers; a strain relief structure aligned with the fibers, and a protective layer integrally bonding the fibers and the strain relief structure together. The strain relief structure has at least a pair of strength members disposed on opposite sides of the aligned fibers and extending lengthwise along the ribbon assembly. The strength members can be copper conductors or can be made of KEVLAR.

DETAILED DESCRIPTION OF THE INVENTION

Figure 1:
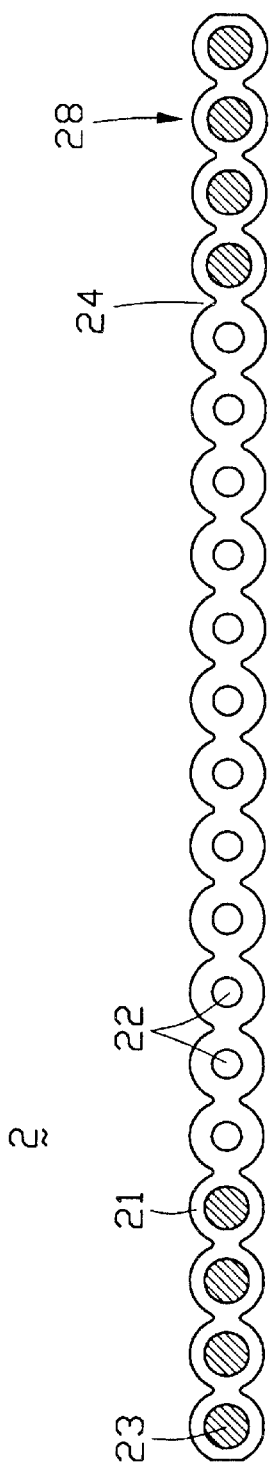
FIG. 1 is a schematic view of an optical fiber ribbon assembly of a first embodiment in accordance with the present invention.

Referring to FIG. 1, an optical fiber ribbon assembly 2 of a first embodiment in accordance with the present invention includes a plurality of individual optical fibers 22, a strain relief structure 28 comprising two groups of strength members 23 positioned on opposite sides of the fibers 22, and a protective layer 21. The protective layer 21 encloses the fibers 22 and the strength members 23 therein and tightly bonds them together. The fibers 22 are aligned with the strength members 23. The protective layer 21 can be made of clear polymer or other suitable materials.

The strength members 23 are cylindrical and have diameters larger than those of the fibers 22. The two groups of the strength members 23 function as a strain relief 28 for the ribbon assembly 2 to partake most of stochastic tensile forces applied onto the ribbon assembly 2 thereby realizing the protection of the fibers 22. Notches 24 are formed on the protective layer 21 between the strain relief structure 28 and the fibers 22 for enhancing the tension resistance of the ribbon assembly 2 as detailed above.

Figure 3:
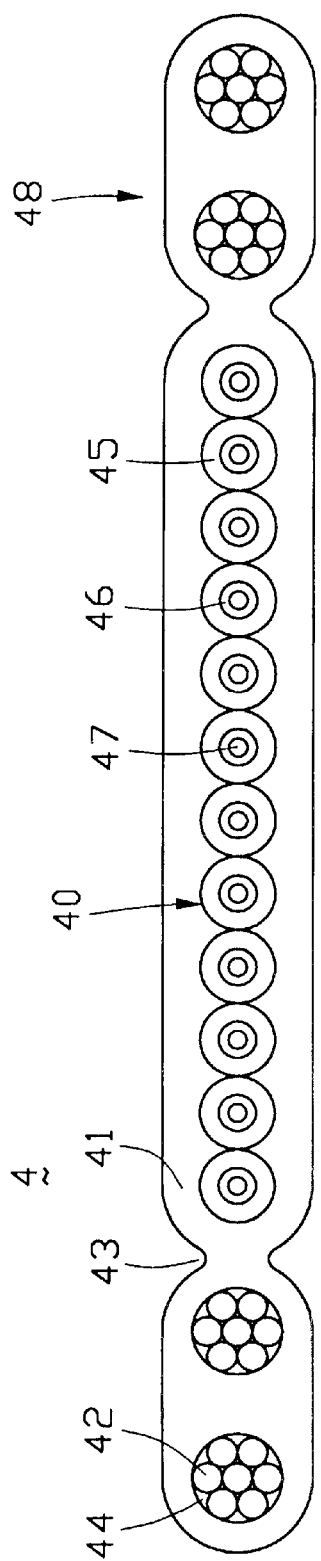
FIG. 3 is a schematic view of an optical fiber ribbon assembly of a third embodiment in accordance with the present invention.
Figure 2:
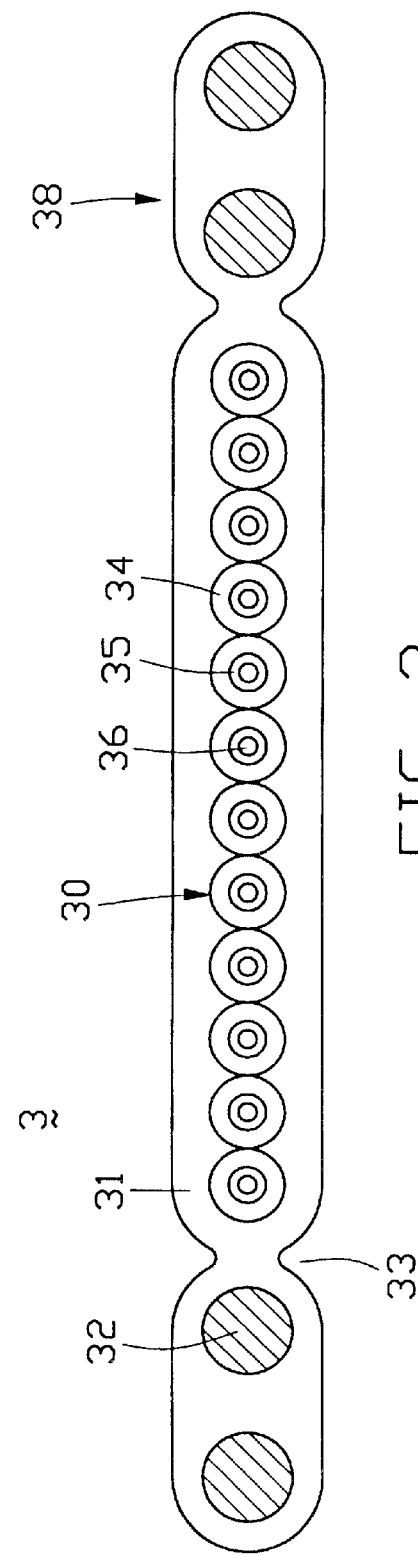
FIG. 2 is a schematic view of an optical fiber ribbon assembly of a second embodiment in accordance with the present invention.
Figure 5:
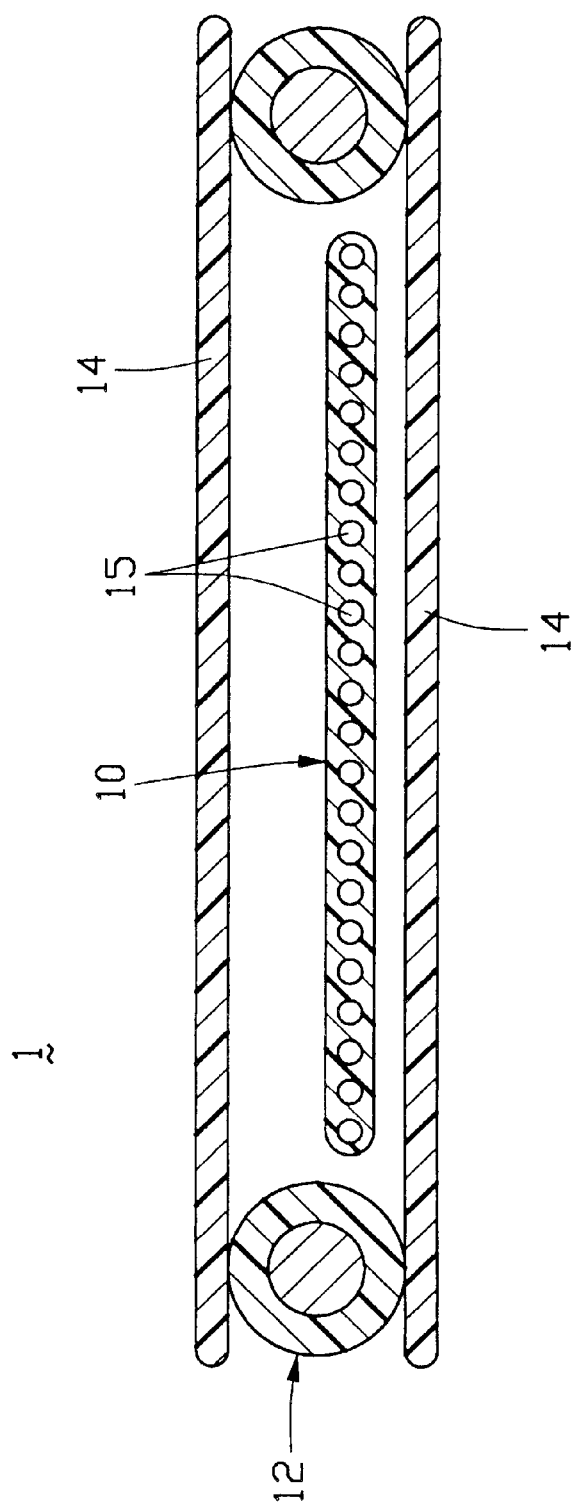
FIG. 5 is a cross-sectional view of a conventional optical fiber ribbon cable combination.

An optical fiber ribbon assembly 3 in accordance with a second embodiment is shown in FIG. 3. The optical fiber ribbon assembly 3 includes a plurality of aligned fibers 30, strain relief structure 38, and a protective layer 31 encapsulating the fibers 30 and the strain relief structure 38 therein. The fibers 30 are primary coated optical fibers (PCOF). Each fiber 30 has a core 36, a cladding 35 and a jacket 34. The strain relief structure 38 includes two groups of strength members 32 positioned on opposite sides of the fibers 30. The strength members 32 can be made of any proper flexible or elastic materials, such as Kevlar, copper conductor, or metal alloy. Notches 33 are formed on the protective layer 31 between the strain relief structure 38 for helping to reduce transfer of the tensile forces exerted on the ribbon assembly 3 to the fibers 30.

FIG. 3 shows a third embodiment of the present invention. In this embodiment, the optical fiber ribbon assembly 4 is similar to the ribbon assembly 3 of the second embodiment. The ribbon assembly 4 includes a plurality of aligned PCOFs 40, a strain relief structure 48 and a protective layer 41 covering and bonding the PCOFs 40 and the strain relief structure 48 together. Each PCOF fiber 40 has a core 47, a cladding 46 and a jacket 45. The protective layer 41 is formed to tightly enclose the fibers 40 and the strain relief structure 48 by extrusion or lamination technique or other suitable techniques. Notches 43 are formed on the protective layer 41 and the strain relief structure 48 for helping to reduce transfer of tensile forces exerted on the ribbon assembly 4 to the fibers 40.

The strain relief structure 48 comprises four groups of strength members 42 received in corresponding channels 44 defined in the protective layer 41. Two groups of strength members 42 are positioned on one side of the fibers 40 and the other two groups of strength members 42 are on the other side of the fibers 40. The strength members 42 can be thin thermoplastic rods, copper conductors or other proper flexible or elastic materials. In the case of copper conductors, the copper conductors 42 may also function as power supply at the same when acting as a strain relief for the ribbon assembly 4.

Figure 4:
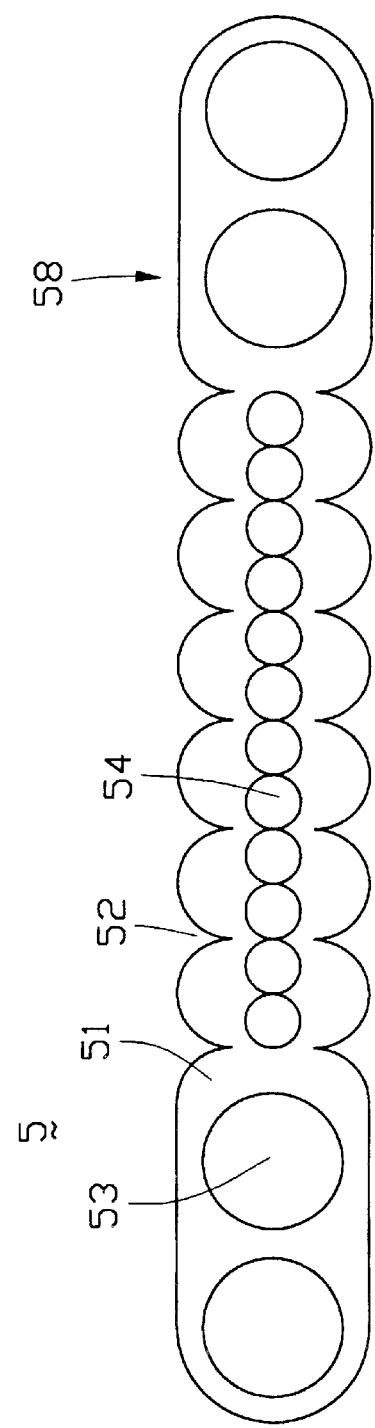
FIG. 4 is a schematic view of an optical fiber ribbon assembly of a forth embodiment in accordance with the present invention.

A forth embodiment is shown in FIG. 4. An optical fiber ribbon assembly 5 of the present invention has a similar structure comprising a plurality of aligned optical fibers 54, a strain relief structure 58 and a protective layer 51 surrounding and bonding the fibers 54 and the strain relief structure 58 together. The protective layer 51 is preferably made of clear PVC and can also be made of other suitable materials. There are notches 52 formed on the protective layer 51 between the aligned fibers 54 and the strain relief mechanism 50.

The notches 52 are also formed on the protective layer 51 between pairs of the fibers 54 whereby it is convenient to separate the fibers 54 in pairs when necessary. The strain relief structure 58 includes four Kevlar rods 53 extending lengthwise along the ribbonassembly 5. The rods 53 are divided into two groups positioned on opposite sides of the fibers 54.

In sum, the ribbon assemblies 2, 3, 4 and 5 of the four embodiments in accordance with the present invention share some basic features. That is, each ribbon assembly 2 (3,4,5) includes a plurality of aligned optical fibers, a strain relief structure aligned with the fibers, and a protective layer tightly enclosing and bonding the fibers and the strain relief structure together. The fibers may either be bare optical fibers or primary coated optical fibers. The fibers can also be first bonded together either by additional layer(s) or just by applying epoxy therebetween before they are bonded together with the strain relief structure.

The strain relief structure commonly employs strength members extending lengthwise along the fibers and disposed on opposite sides of the fibers. The strength members are made of flexible/elastic materials, such as Kevlar, PVC, metal (e g., copper), or metal alloy. The strain relief structure also includes notches formed on the protective layer between the fibers and the strain relief structure as detailed in the above embodiment descriptions.

It can be understood that the invention provides a simple, economic, controllable design in comparison with most traditional optical fibers requiring to be woven into the support treads to form the whole assembly in which several factors such as the weaving angle, the weaving tension and weaving speed, are required to be coordinated with each other. In additional, the planar extrusion guarantees straightness of the whole assembly including the fibers themselves, thus efficiently preventing the light leaking problem.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, in FIG. 4 the notches 52 are formed between every adjacent two pairs. Similarly, the notches can be formed between every three or more fibers to dividing groups of fibers, if necessary.

What is claimed is:

1. An optical fiber ribbon assembly, comprising:
    an optical fiber subassembly comprising a plurality of optical fibers aligned with each other;
    strength members being equidistantly disposed on opposite side of the optical fiber subassembly, the strength members extending lengthwise along the optical fiber subassembly; and
    a protective layer integrally bonding the optical fiber subassembly and the strength members together, the protective layer having at least a notch defined therein between one of the outermost optical fibers and the strength member adjacent that outermost optical fiber, said notch being dimensioned to be large enough to help reducing transfer of tensile forces exerted on the ribbon assembly to the fibers while being small enough to prevent easy separation between the fibers and the strain relief mechanism.

2. The optical fiber ribbon assembly as claimed in claim 1, wherein the fibers of the optical fiber subassembly are bonded together.

3. The optical fiber ribbon assembly as claimed in claim 2, wherein the strength members are made of KEVLAR.

4. The optical fiber ribbon assembly as claimed in claim 2, wherein the strength members are copper conductors.

5. The optical fiber ribbon assembly as claimed in claim 4, wherein at least one of the copper conductors functions as a power supply.

6. The optical fiber ribbon assembly as claimed in claim 1, wherein the fibers are bare fibers or coated fibers.

7. The optical fiber ribbon assembly as claimed in claim 1, wherein at least a pair of notches is formed on the protective layer between the fibers and the strength members.

8. The optical fiber ribbon assembly as claimed in claim 1, wherein the protective layer is formed through extrusion.

9. The optical fiber ribbon assembly as claimed in claim 1, wherein the protective layer is made of one of polyvinyle chloride, thermoplastics and polymer.

10. A method of making an optical fiber ribbon assembly comprising the steps of:

providing a plurality of optical fibers extending along a first horizontal direction while being juxtaposed with one another in a second horizontal direction perpendicular to said first horizontal direction;

providing strain relief mechanism by two sides of said optical fibers, said strain relief mechanism extending along said first horizontal direction and made of different material from that of the optical fibers;

applying a protective coating upon both the optical fibers and the strain relief mechanism; and defining at least a notch in the protective coating between one of the outermost optical fibers and the strength relief mechanism adjacent that outermost optical fiber, said notch being dimensioned to be large enough to help to reduce transfer of tensile forces exerted on the ribbon assembly to the fibers while being small enough to prevent easy separation between the fibers and the strain relief mechanism;

wherein the strain relief mechanism absorbs most forces imposed upon the ribbon assembly, and the optical fibers extend straightly without intervening the strain relief mechanism while being fully enclosed in the protective coating with more tolerance of deflection along the first horizontal direction and less tolerance of deflection along the second horizontal direction.

11. The method as claimed in claim 10, wherein said strain relief mechanism defines a larger cross-section than each of said optical fibers.

12. The method as claimed in claim 10, wherein a notch is formed in the protective coating for dividing the optical fibers and the strain relief mechanism.

13. The method as claimed in claim 10, wherein said strain relief mechanism are copper conductors.

* * * * *